United States Patent [19]

Marca

[11] Patent Number: 5,050,074
[45] Date of Patent: Sep. 17, 1991

[54] SYSTEM FOR FACILITATING COORDINATION OF ACTIVITIES BY A PLURALITY OF ACTORS WITH AN OBJECT DATABASE AND STATE/ACTION IDENTIFICATION

[75] Inventor: David A. Marca, Lowell, Mass.

[73] Assignee: Digital Equipment Corporation, Maynard, Mass.

[21] Appl. No.: 173,768

[22] Filed: Mar. 28, 1988

[51] Int. Cl.$^5$ .............................................. G06F 15/21
[52] U.S. Cl. .................................. 364/200; 364/282.1
[58] Field of Search ... 364/200 MS File, 900 MS File

[56] References Cited

U.S. PATENT DOCUMENTS 4,866,605  9/1989  Nakano ............................... 364/200

OTHER PUBLICATIONS

D. Marca and C. McGowan, *Static and Dynamic Data Modeling for Information System Design*, IEEE Proceedings, 6th International Conference on Software Engineering, Sep. 13–16, 1982, Tokyo, Japan, pp. 137–146.
D. Marca and P. Cashman, *Towards Specifying Proecdural Aspects of Cooperative Work*, IEEE Proceedings, 3rd International Workshop on Software Specification and Design, Aug. 26–27, 1985, London, England, pp. 151–154.
D. Marca, S. Schwartz, and G. Cassaday, *A Specification Method for Coordinated Work*, IEEE Proceedings, 4th International Workshop on Software Specification and Design, Apr. 3–4, 1987, pp. 242–248.
D. Marca, N. McKenna, and S. White, *Computer-Aided Support for Coordination Technology*, ; 1st International Workshop on Computer-Aided Softward Engineering, May 27–29, 1987.

*Primary Examiner*—Lawrence E. Anderson
*Attorney, Agent, or Firm*—Finnegan, Henderson, Farabow, Garrett and Dunner

[57] ABSTRACT

A new activity coordination system coordinates actions in connection the various constituents of an activity by a plurality of actors. The system includes a plurality of objects each associated with a constituent, with each object including state information defining a state and constituent information containing information relating to said constituent. The system further includes tables to identify processing actions in connection with the various states of each object, state transitions for each object in connection with each action defined by said action definition table, and actors associated with each constituent. The system initially determines, in response to constituent information from an actor and the object access definition table, the association of the actor with respect to a constituent and selectively processes the object associated with the constituent as defined by said action definition table and modifies the state of the object as defined by said state transition definition table.

5 Claims, 6 Drawing Sheets

ACTIVITY COORDINATING SYSTEM 10

FIG. 2B ROLE/OBJECT TABLE 15

FIG. 2A ACTOR/ROLE TABLE 14

STATE TRANSITION TABLE 17

STATE/ACTION TABLE 16

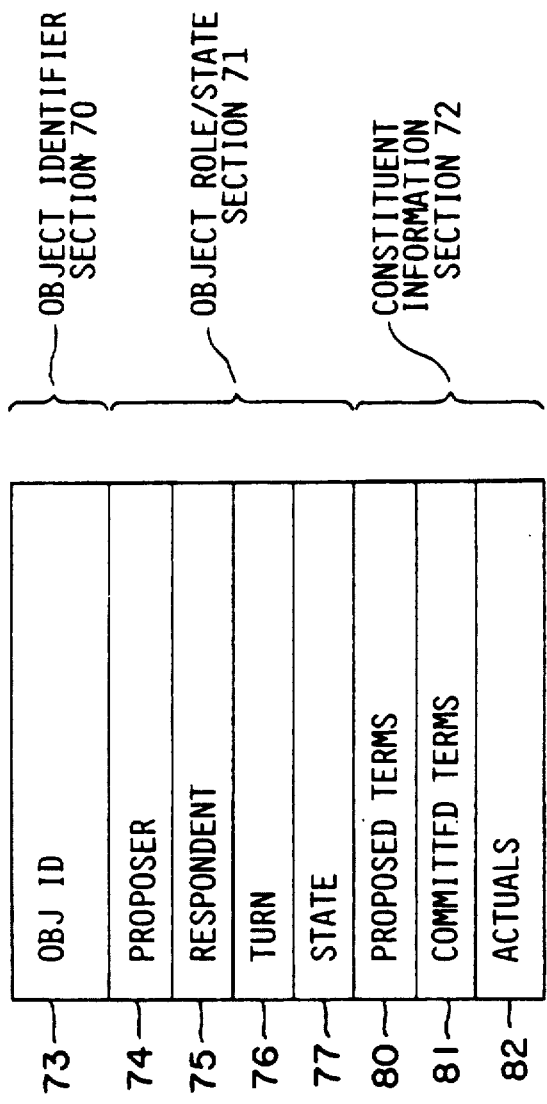

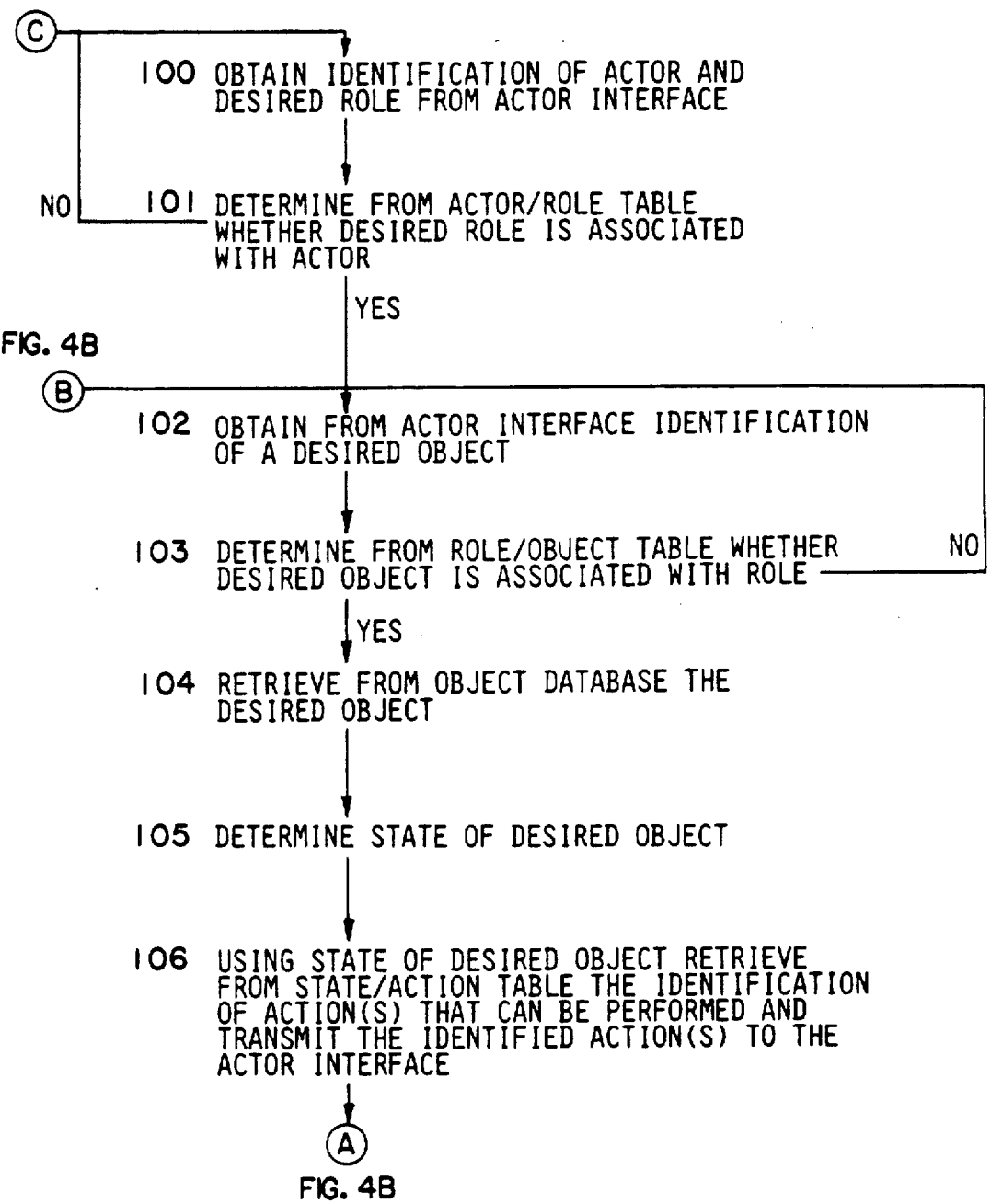

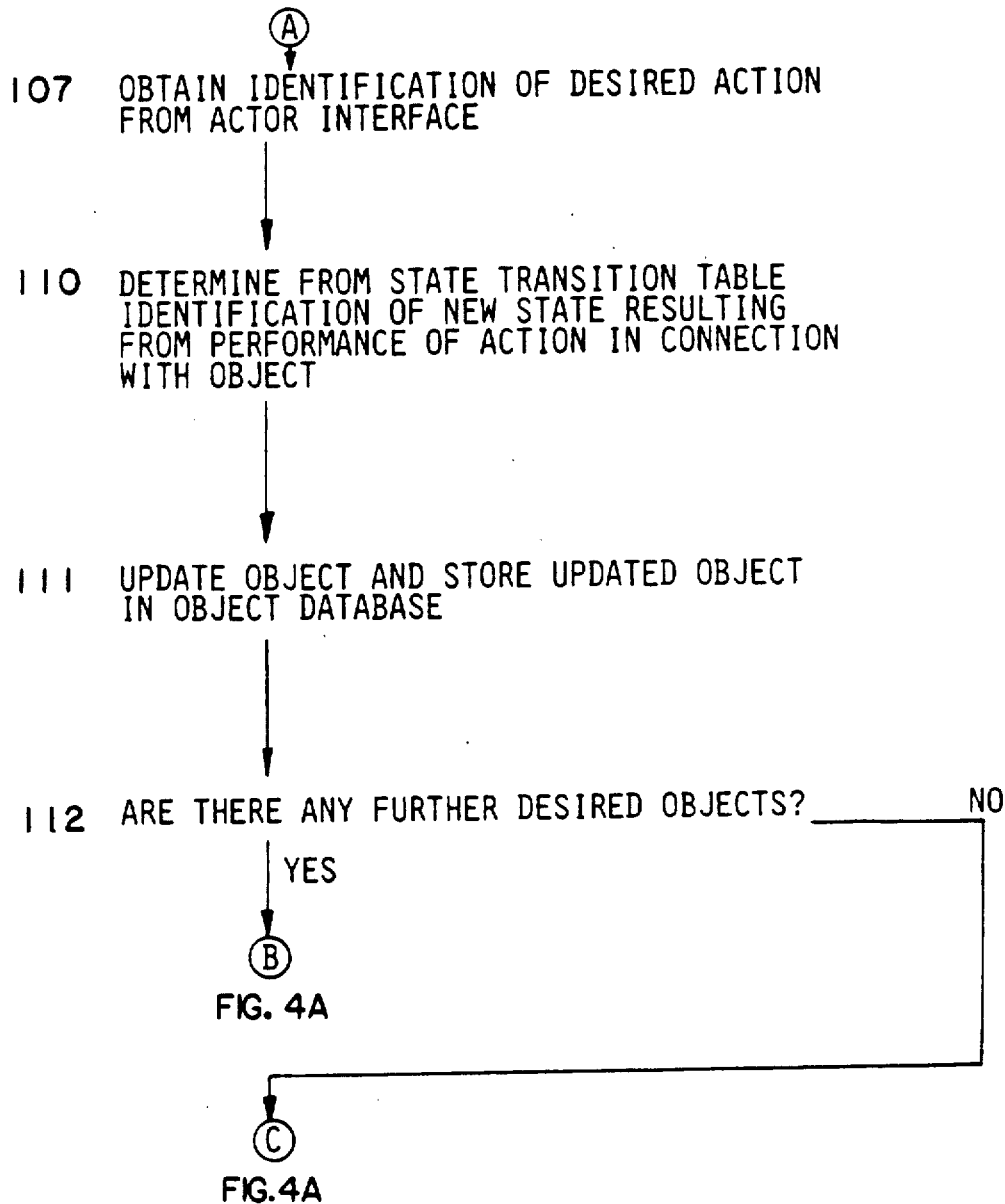

5,050,074

SYSTEM FOR FACILITATING COORDINATION OF ACTIVITIES BY A PLURALITY OF ACTORS WITH AN OBJECT DATABASE AND STATE/ACTION IDENTIFICATION

BACKGROUND OF THE INVENTION

1. Field of the Invention

The invention relates to digital data processing systems and more particularly provides a computer system that facilitates coordination of activities of a plurality of actors in connection with a common operation.

2. Description of the Prior Art

As the costs of digital data processing systems, that is, computers, decrease, they are being used more widely in the workplace. For some time, computers have been used to provide critical personnel, bookkeeping, accounting and inventory services for companies. More recently, computers have been used to provide assistance in a number of other office activities, most notably word processing, communications, computer-aided design, and computer-aided engineering and manufacturing.

Many of the areas in which computers provide office support have been those in which the activities are largely individual or in which all actors in the activity have a common goal presumed unaffected by other activities within an organization which may be competing for resources and the like. For example, in word processing, typically only one person works on a particular document, or portion of a document at a given time, and thus word processing is largely an individual activity. Similarly, in computer-aided design, engineering and manufacturing, even if more than one person is involved in the activity, the activity tends towards a common goal, that is, designing and manufacturing a product. However, many activities in the workplace are not isolated, that is, they require coordination of a number of actors and competition for limited resources, financial and otherwise, that are available within a company.

SUMMARY OF THE INVENTION

The invention provides a new and improved system, used in conjunction with a computer, for coordinating activities by a plurality of actors within a common operation having multiple constituents.

In brief summary, the new computer system is an activity coordination system which coordinates actions in connection with the various constituents of an activity by a plurality of actors. The system includes a plurality of objects each associated with a constituent, with each object including state information defining a state and constituent information containing information relating to said constituent. The system further includes an action definition table identifying processing actions in connection with the various states of each object, a state transition definition table for defining state transitions for each object in connection with each action defined by said action definition table, and an object access definition table identifying actors associated with each constituent. The system initially determines, in response to constituent information from an actor and the object access definition table, the association of the actor with respect to a constituent and selectively processes the object associated with the constituent as defined by said action definition table and modifies the state of the object as defined by said state transition definition table.

The activity coordination system, by use of the objects and tables, formalizes the various constituents of an activity, the actors in those constituents and also the actions which may be taken in connection with each of the constituents at any given time.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIGS. 2A through 2D and 3 depict details of data structures shown in FIG. 1; and FIGS. 4A and 4B depict a flow diagram illustrating the operations of the system depicted in FIG. 1.

DETAILED DESCRIPTION OF AN ILLUSTRATIVE EMBODIMENT

Figure 1:
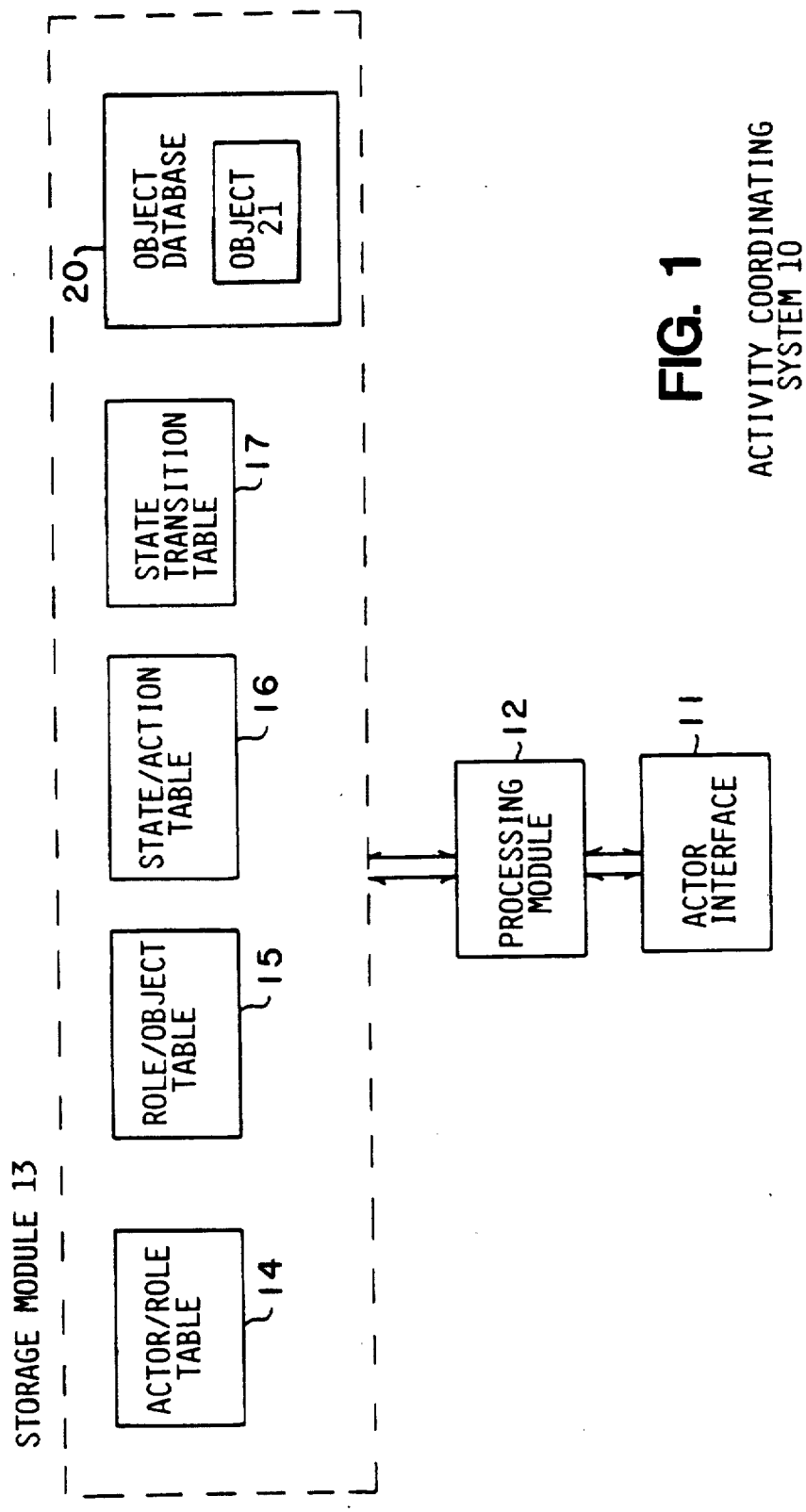
FIG. 1 is a general functional diagram depicting an activity coordination system constructed in accordance with the invention.

FIG. 1 is a general functional diagram depicting an activity coordination system 10 constructed in accordance with the invention. In one embodiment, the activity coordination system 10 generally comprises a suitably programmed digital computer system. With reference to FIG. 1, the activity coordination system 10 includes an actor interface 11 through which an operator, or actor, using the activity coordination system 10 provides information and receives responses, a processing module 12 that processes the information received from the actor interface 11 and provides responses, in the form of processed information, to the actor interface 11, and a storage module 13 that stores information that the processing module uses in its processing. The information in the storage module 13 is organized into data structures including several tables, namely, an actor/role table 14, a role/object table 15, a state/action table 16 and a state transition table 17, and an object database 20 containing one or more objects generally identified by reference numeral 21.

The organization of the tables 14 through 17 and object database 20 is described below in connection with FIGS. 2A through 3, and the operations performed by processing module 12 are described below in connection with FIGS. 4A and 4B. Preliminarily, however, the activity coordination system 10, using the contents of the various tables 14 through 17 and the objects 21 in the object database 20, formalizes and coordinates the actions of a number of actors in connection with a single activity having multiple constituents within an organization, such as a business, while the actors may have competing demands on them from a number of other activities within the organization. The activity coordination system 10 facilitates coordination of the various constituents of an activity, formalizing negotiations among actors in the various roles, recording proposed and committed terms resulting from the negotiations, permitting scheduling, and so forth, to enable the achievement of the intended result of the activity.

In the operation of this activity coordination system, the actor/role table 14 identifies roles each actor performs in the activity and the role/object table 15 identifies objects which may be controlled by the roles identified in the actor/role table 14. Each object 21 contains information relating to a constituent of an activity, such as the state of the constituent, as well as negotiations, commitments, and so forth which take place among actors, using the activity coordination system 10, in connection with the constituent. The state/action table 16 determines the actions that the actor may take in connection with the objects based on their states, and the state transition table 17 determines, based on the state of the object and an action selected by the actor, a new state for the object.

A specific example would facilitate an understanding of the utility and operation of the activity coordination system 10. In one specific embodiment, the activity coordination system 10 assists in an activity which includes the design and manufacture of a product, within the context of an organization which may include a plurality of such activities. In such a system, the actors comprise the particular people who are involved in the activity, and the roles may include such actions as Product Manager, Engineer, Finance, Marketing, Manufacturing, and so forth. The actor/role table 14 thus identifies the particular persons who may perform the various roles. In that context, the Product Manager role is associated with the actor responsible for the product. The Engineer role is associated with the actor responsible for providing engineering services in connection with the design of the product as well as other products, if any. The Finance role is associated with the actor who is responsible for providing funds in connection with the product as well as other products, if any. Similarly, the Marketing and Manufacturing roles are associated with the actors who are responsible for providing the respective services in connection with the product as well as other products, if any.

Continuing with the example, the objects 21 identify various constituents required in connection with the activity. The actor performing the Product Manager role may, for example, need to obtain funds for the activity from the actor with the Finance role, and so Funding may comprise a constituent of the activity. The actor performing the Product Manager role may also need to have the actor performing the Engineer role provide engineering services over a time period to provide a product design by a certain date and with a selected cost, which comprises another constituent of the activity. In addition, the actor performing the Product Manager role may also need to have the actors performing the Marketing and Manufacturing roles provide services in connection with such constituents of the activity as the marketing and manufacture of the product, on scheduling and financial arrangements as the various actors may agree.

Each of the constituents of the activity is associated with an object 21, which includes information as to the negotiations among actors to determine the various scheduling and financial terms under which the constituent will be performed, as well as the state of the constituent. The state may indicate, for example, whether negotiations are proceeding, whether the actors have committed to scheduling, financial and other terms relating to the constituent, whether the constituent has been completed, and so forth. The state further relates to the actions which may be taken in connection with the respective constituents. Thus, for example, if negotiations are proceeding among the various actors with respect to the various constituents of the activity, the states of the objects corresponding to those constituents will reflect a negotiation state. Similarly, if actors have made commitments with respect to various constituents, the states of the corresponding objects will reflect the commitment state. Furthermore, when actors have completed the respective constituents, the states of the corresponding objects will reflect the completion state. Thus, the activity coordination system 10 permits the formalization and coordination of the various constituents of an activity to enable the orderly achievement of the intended result of the activity.

Figures 2A, 2B:
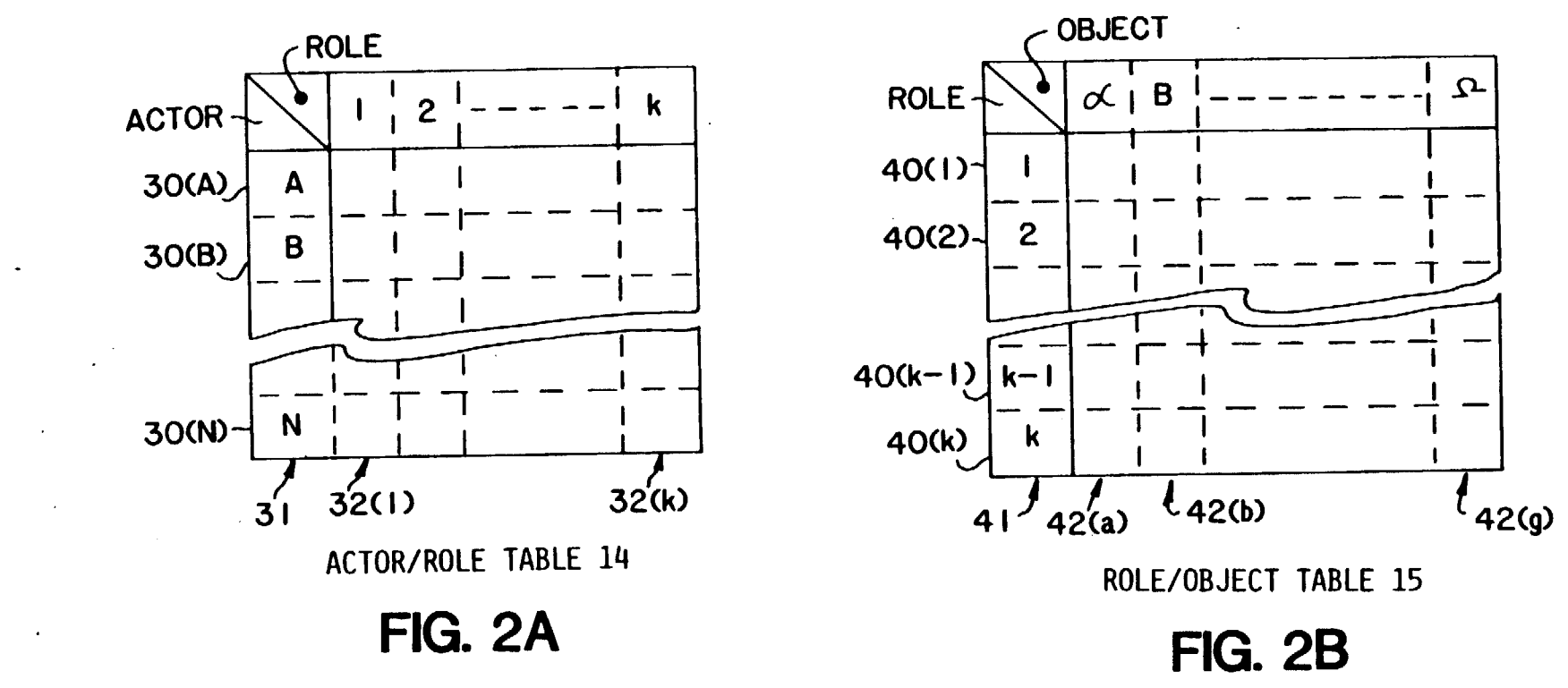
Figure 2D:
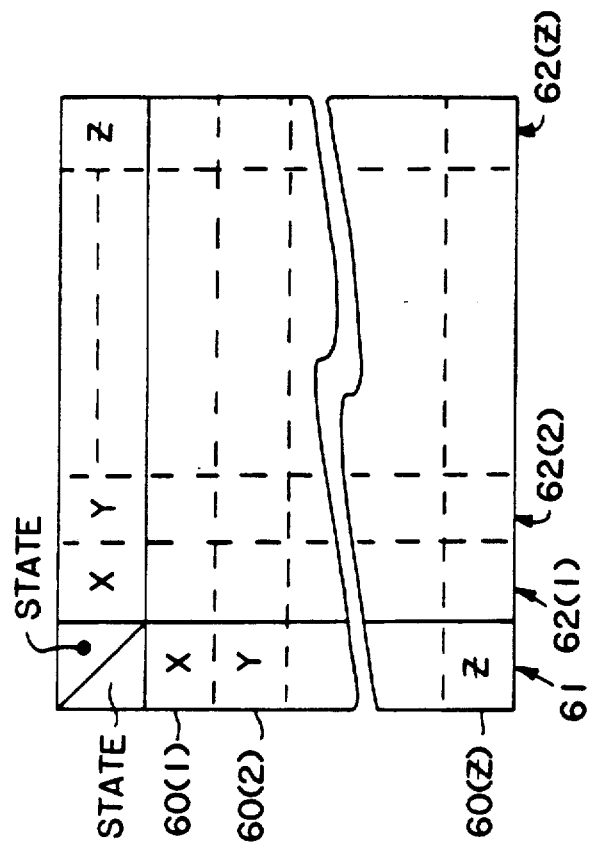

With this background, the structures of the tables 14 through 17 and objects 21 stored in the object database 20 will be described in connection with FIGS. 2A through 2D and 3. With reference to FIG. 2A, the actor/role table 14 includes a plurality of entries 30(A) through 30(N) (generally identified by reference numeral 30) each including an actor identification field 31 and a plurality of role flag fields 32(l) through 32(k) (generally identified by reference numeral 32) each defining a flag. Each entry 30 is associated with one actor, who is identified by the contents of the actor identification field 31, whose actions are to be coordinated by the activity coordination system 10. Similarly, each role flag field 32 in each entry 30 is associated with one role in the activity, that is, the first role flag field 32(1) in all of the entries 30 is associated with one specific role in the activity, the second role flag field 32(2) in all of the entries 30 is associated with a second specific role, and so forth. If an actor is associated with, that is, if the actor can perform, one or more roles, the flags of the role flag fields 32 associated therewith have set conditions; alternatively, if an actor cannot perform a specific role in connection with the activity, the flag of the role flag field 32 associated with the activity has a cleared condition.

Similarly, the role/object table 15, which is shown in detail in FIG. 2B, includes a plurality of entries 40(l) through 40(k) (generally identified by reference numeral 40), each including a role identification field 41 and a plurality of object flag fields 42(a) through 42(g) (generally identified by reference numeral 42). Each entry 40 is associated with a role, which is identified by the contents of the role identification field 41, which is, in turn, associated with the role flag fields 32 in the actor/role table 14. Similarly, each object flag field 42 is associated with one object 21, that is, the first object flag field 42(a) in all of the entries 40 is associated with one specific object 21, the second object flag field 42(b) in all of the entries 40 is associated with a second object 21, and so forth. If a role is associated with one or more objects 21, that is, if an actor in a role can access and modify one or more objects 21, the flags of the respective object flag fields 42 have set conditions; alternatively, if a role is not associated with an object 21, such that an actor in a role cannot access and modify the object 21, the flag of the associated object flag field 42 has a cleared condition.

Figure 2C:
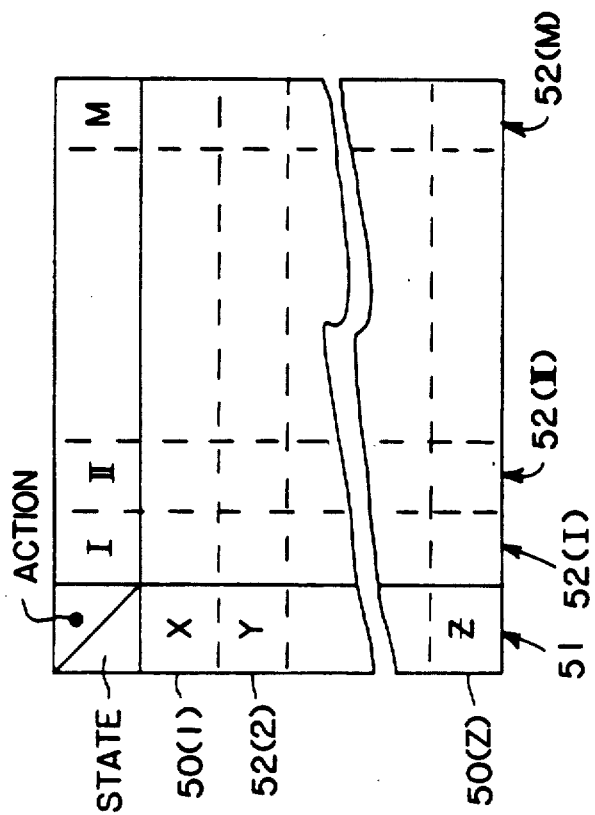

The state/action table 16, which is shown in detail in FIG. 2C, also includes a plurality of entries 50(1) through 50(Z) (generally identified by reference numeral 50), each including a state identification field 51 and a plurality of action flag fields 52(I) through 52(M) (generally identified by reference numeral 52). As noted above, each object 21 can exist in one of a plurality of states, and each entry 50 is associated with a state in which the object 21 can exist. In each entry 50, the state identification field 51 identifies the state associated with the entry, and the action flag fields 52 contain flags that identify the actions that can be taken in connection with the object 21 when the object 21 is in the state associated with the entry 50. Specifically, the action flag fields 52 in the entries 50 are associated with the same actions, that is, action flag fields 52(I) in the entries 50 are all associated with one action, action flag fields 52(II) in all of the entries 50 are all associated with a second action, and so forth. If a particular action can be performed in connection with an object 21 which has a particular state, the flag in the action flag field 52 associated with the action of the entry 50 associated with the state has a set condition; alternatively if an action cannot be performed in connection with the object 21 which has a particular state, the flag in the action flag field 52 associated with the action of the entry 50 associated with the state has a cleared condition.

In addition, the state transition table 17, which is shown in detail in FIG. 2D, has a plurality of entries 60(1) through 60(Z) (generally identified by reference numeral 60), each including a state identification field 61 and a plurality of state transition fields 62(1) through 62(Z). Like the entries 50 in the state/action table 16, each entry 60 in the state transition table 17 is associated with one state in which an object 21 can exist. In each entry 60, the state identification field 61 identifies the state with which the entry 61 is associated. Each of the state transition fields 62 in each entry 60 is also associated with a state, with one state transition field 62 being associated with each state in which the object 21 can exist. Furthermore, the state transition fields 62 in the various entries 60 are associated with the various states, that is, the state transition field 62(1) in all of the entries 60 is associated with a first state, the state transition field 62(2) in all of the entries 60 is associated with a second state, and so forth. The contents of each state transition field 62 in an entry 60 identify an action, which, when performed in connection with an object 21 which is in the state identified in the entry's state identification field 61, will result in the object 21 being in the state associated with the state transition field 62.

It will be appreciated that the activity coordination system 10 may include a plurality of objects 21 which have different sets of states and actions. To accommodate that, the activity coordination system 10 may include a plurality of state/action tables 16, with each state/action table 16 being associated with one of the objects 21 to define the actions which can be performed in connection with the object 21. In this case, each of the state/action tables 16 includes a tag identifying the object 21 associated with the state/action table 16.

In addition, actions performed by the activity coordination system 10 in connection with diverse objects 21 may result in transitions to different states. To accommodate this, the activity coordination system 10 may include a plurality of state transition tables 17, with each state transition table 17 defining the state transitions that can occur in connection with the actions that can be performed in connection with an object. In this case, each of the state transition tables 17 includes a tag identifying the object 21 associated with the state transition table 17.

As noted above, each object 21 stored in the object database 20 contains state and other information relating to a constituent of an activity and is accessed and modified by the processing module 12 in response to information provided by the actor through the actor interface 11 as described below. The structure of an object 21 in the object database 20 is depicted in FIG. 3.

With reference to FIG. 3, an object 21 includes three sections, namely, an object identifier section 70, an object role/state section 71 and a constituent information section 72. The object identifier section 70 includes a single field, namely, an object identification field 73.

The object role/state section 71 of object 21 includes four fields, namely, a proposer field 74, a respondent field 75, a turn field 76, which identify the roles in which the various actors can enable the processing module 12 to access the object, and a state field 77 which identifies the state of the object 21. The proposer field 74 and respondent field 75 identify roles, which are associated with the various role flag fields 32 (FIG. 2A) in the actor/role table 14. If either the proposer field 74 or the respondent field 75 identify a role which an actor can perform, as indicated by the actor/role table 14, the actor may enable the processing module 12 to access the object 21.

The turn field 76 of the object role/state section 71 further serves to restrict access to the object 21, in particular to an actor performing either the role identified by the requester field 74 or an actor performing the role identified by the respondent field 75. Specifically, the contents of the turn field 76 identify either the proposer field 74 or the respondent field 75, and an actor performing the role identified by the contents of the field 74 or 75 identified by the turn field 75 can enable the processing module to access the object 21. When an actor enables the processing module 12 to access the object 21, the processing module 12 modifies the contents of the turn field 76 to identify the other of the proposer field 74 or the respondent field 75 so that access to the object 21 alternates between an actor performing the role identified by the proposer field 74 and an actor performing the role identified by the respondent field 75. The state field 77 contains state information identifying the state of the object 21.

The constituent information section 72 contains information as to the constituent of the activity associated with the object 21. The particular fields which are included in the constituent information section 72 depend upon the particular constituent or activity being coordinated by the activity coordination system 10. In one specific embodiment in which the activity coordination system 10 coordinates the design and manufacture of a product within an organization, the constituent information section includes a proposed terms field 80, a committed terms field 81 and an actuals field 82. The processing module 12 inserts into the proposed terms field 80 information identifying terms under which the actors performing the roles and operating as proposer and respondent as identified in fields 74 and 75, propose to perform the constituent of the activity associated with the object. When the proposer and respondent both agree to the terms in the proposed terms field 80, the processing module 12 inserts the agreed terms in the committed terms field 81. Finally, the actuals field 82 is provided to receive information as to the actual result of the constituent, to facilitate comparisons with the previously-agreed terms in the committed terms field 81.

With this background, the detailed operations of the processing module 12 (FIG. 1) will be described in connection with FIGS. 4A and 4B, following which a discussion of the operations of the activity coordination system 10 in connection with a specific example will be presented. With reference to FIG. 4A, when an actor initiates use of the activity coordination system 10, the processing module 12 first obtains from the actor, through the actor interface 11, the identification of the actor and a role (step 100). The processing module 12 then determines from the actor/role table 14 whether the actor may perform the identified role (step 101) by determining whether a flag is set in the role flag field 32 associated with the role in the entry 30 in the actor/role table 14 associated with the actor. If the flag is not set, the actor is not permitted to perform the requested role and so the processing module 12 returns to step 100 to permit the actor to identify another role.

If, in step 101, the processing module 12 determines that the flag is set in the role flag field 32 associated with the role identified by the actor, the processing module 12 sequences to step 102, in which it obtains, from the actor through the actor interface 11, the identification of an object 21 that the actor wishes the processing module 12 to access. The processing module 12, using the role/object table 15, then determines whether the identified object 21 is associated with the role, that is, whether the actor, performing the role, can enable the processing module 12 to access the object 21 (step 103). In this operation, the processing module 12 determines whether the flag is set in the object flag field 42, associated with the identified object 21, of the entry 40 associated with the role in the role/object table 15 (FIG. 2B). If the flag is not set, the processing module 12 returns to step 102 to obtain the identification of another object 21, or alternatively returns to step 100 if no other object 21 is identified.

If, on the other hand, in step 103 the processing module 12 determines that the flag is set in the object flag field 42 indicating that the actor, performing the role, can enable the processing module 12 to access the object 21, the processing module 12 retrieves the identified object 21 from the object database 20 (step 104) and determines its state (step 105) as indicated by the contents of its state field 77. Using the identified state, the processing module 12 then, using the state/action table 16, identifies the actions that can be performed in connection with the object 21 (step 106). In so doing, the processing module 12 identifies the actions associated with the flags that are set in the action flag fields 52 in the entry 50 associated with the state identified by the contents of the state field 77. It will be appreciated that, if the storage module contains a plurality of state/action tables 16 each associated with one or more selected objects, the processing module 12 will use the state/action table 16 associated with the object 21 in this operation.

The processing module 12 then transmits the identified actions to the actor interface 11 to permit the actor to identify a desired action and provide additional information, if necessary, to permit the actor to perform processing of the object 21 as required in connection with the action. After the actor, through the actor interface 11, identifies an action and provides any additional information which may be necessary (step 107), the processing module 12 determines from the state transition table 17 the identification of the new state resulting from performance of the action in connection with the object 21 (step 110). The processing module 12 then performs any necessary processing in connection with the additional information, updating the constituent information section 72 and state field 77 of the object 21 in the object database 20 (step 111).

Following step 111, which is the last step in the processing of the selected object 21, the processing module 12 then inquires of the actor, through the actor interface 11, whether the actor wishes to initiate processing in connection with any other objects 21 (step 112). If so, the processing module 12 returns to step 102 to permit the selection of another object 21. However, if the actor does not wish to initiate processing in connection with an other objects 21, the processing module 12 returns to step 100. At that point, another actor may initiate processing of objects by the processing module 12.

It will be appreciated that the activity coordination system 10 (FIG. 1), through the various objects 21 and the tables 14 through 17, facilitates coordination of the various constituents of an activity, formalizing negotiations among actors in the various roles, recording proposed and committed terms resulting from the negotiations, permitting scheduling, and so forth, to enable the achievement of the intended result of the activity. The various constituents of the activity are identified and formalized by the various objects 21 provided in the activity coordination system 10. Each object 21 identifies the state of a constituent, and provides a mechanism to record the various negotiations and other information in connection with the constituent. The actor/role table 14 and role/object table 15 jointly provide a mechanism for limiting access to the various objects 21, so that only selected actors in selected roles can effect certain constituents. The state/action table 16 and state transition table 17 formalize the progression of the various constituents, by limiting the actions which may be taken in connection with each of the constituents to those set forth in the state transition table 17, with the actions which can be taken at any time being limited to those set forth in the state/action table 16. Thus, the actor/role table 14 and role/object table 15 limit the constituents in which each actor may participate and the state/action table 16 and state transition table 17 limit and formalize the actions which may be taken in connection with each of the objects 21.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

1. A system for coordinating actions by a plurality of actors in connection with various constituents of an activity, comprising:

actor interface means for initiating use of the system by a selected actor, for providing information to the system from the actor, and for providing responses to the actor from the system;

actor/role definition means for storing and defining a plurality of roles that the actor may assume with respect to the constituents;

an object database for storing a plurality of objects, each object being associated with a constituent, wherein each object comprises:

identifier means for identifying the object;

state means for defining a state of the object;

information means for storing information relating to the associated constituent;

state/action definition means for storing and defining a plurality of actions that the actors may perform in connection with the various states of each object;

state transition definition means for storing and defining state transitions for each object in connection with each action defined by the action/state definition means;

role/object access definition means for storing and defining the objects which may be accessed by the actor assuming a particular role;

processing means, responsive to the information provided by the actor interface means, for determining, in response to the role/object access definition means, whether the actor assuming a particular role, as defined by the actor/role definition means, may access an object, for determining, in response to the state/action definition means, whether the actor may perform an action on the object, for performing the action on the object according to the information provided by the actor interface means, in response to the determination as to whether the actor may access the object and the determination as to whether the action may be performed on the object, and for modifying the state of the object as defined by the state transition definition means in response to the action performed on the object.

2. A system according to claim 1, wherein the actor interface means further comprises:

configuration means for initializing the system, whereby the plurality of actors, and the plurality of roles are originally defined, and wherein the processing means establishes the actor/role definition means in response to the configuration means.

3. A system according to claim 1, wherein the each object in the object database further comprises:

role/state means for further defining the particular role assumed by the actor, according to the state of the object and according to the roles that the plurality of actors have assumed with respect to the object, wherein the processing means determines whether the actor assuming the particular role, as defined by the actor/role definition means, and as further defined by the role/state means may access the object.

4. A system according to claim 3, wherein the role/state means comprises means defining the role the actor may assume according to results of negotiations between the actor and other actors, and wherein the information means stores actual terms relating to the associated constituent, and proposed terms and committed terms relating to the associated constituent as determined by results of negotiations between the actor and other actors.

5. A method performed in a data processing system for coordinating actions in connection with constituents of an activity by a plurality of actors, comprising the steps of:

defining a plurality of actors associated with an activity;

defining a plurality of roles the actors may assume with respect to the constituents of the activity;

obtaining identification information from a selected actor and information regarding a particular role desired the actor;

using a role definition table to identify the roles that the actor may assume;

defining a database containing a plurality of objects, each object being associated with a constituent of the activity and each object containing information regarding the associated constituent, wherein the information comprises the results of negotiations among the actors in determining the terms under which the constituent will be performed and information regarding the state of the constituent;

using an object definition table to identify an object that the actor may access in consideration of the particular role the actor has assumed, as identified by the role definition table;

using a state transition table to record the various states of the object;

retrieving the object from the object database;

using an action definition table to identify which actions the actor may perform on the object in consideration of the state of the object and the terms under which the constituent will be performed;

transmitting to the actor information regarding which actions the actor may perform on the object;

obtaining information from the actor regarding an action to be performed on the object;

performing the action on the object, in response to the information obtained from the actor, after determining that the actor may access the object by referring to the object definition table and that the actor may perform the action on the object by referring to the action definition table;

updating the state transition table to record changes in the various states of the object following performance of the action; and providing responses to the actor regarding the action performed on the object.

* * * * *